(12) United States Patent
Kim et al.

(10) Patent No.: US 9,998,166 B2
(45) Date of Patent: Jun. 12, 2018

(54) PROTECTIVE COVER FOR ELECTRONIC DEVICE

(71) Applicant: Samsung Electronics Co., Ltd., Gyeonggi-do (KR)

(72) Inventors: Myung-Suk Kim, Gyeonggi-do (KR); Yong-Sang Yun, Gyeonggi-do (KR); Kwan-Ho Lee, Seoul (KR)

(73) Assignee: Samsung Electronics Co., Ltd., Yeongtong-gu, Suwon-si, Gyeonggi-do (KR)

(*) Notice: Subject to any disclaimer, the term of this patent is extended or adjusted under 35 U.S.C. 154(b) by 0 days. days.

(21) Appl. No.: 14/736,433

(22) Filed: Jun. 11, 2015

(65) Prior Publication Data
US 2015/0365123 A1 Dec. 17, 2015

(30) Foreign Application Priority Data
Jun. 11, 2014 (KR) .................. 10-2014-0071114

(51) Int. Cl.
| | | |
|---|---|---|
| *H04M 1/00* | (2006.01) | |
| *H04B 1/3888* | (2015.01) | |
| *G06F 1/16* | (2006.01) | |
| *A47B 23/04* | (2006.01) | |
| *F16B 1/00* | (2006.01) | |

(52) U.S. Cl.
CPC ......... *H04B 1/3888* (2013.01); *A47B 23/043* (2013.01); *F16B 1/00* (2013.01); *G06F 1/1628* (2013.01); *G06F 1/1632* (2013.01); *F16B 2001/0035* (2013.01)

(58) Field of Classification Search
CPC ..... H04B 1/3816; H04M 1/0214; H01Q 1/44; G06F 1/181; G06F 1/1616; G06F 1/1601; G06F 1/1628

USPC .......... 455/575.1, 558; 343/720; 312/223.1; 361/679.01, 0.21; 206/576
See application file for complete search history.

(56) References Cited

U.S. PATENT DOCUMENTS

| | | |
|---|---|---|
| 8,472,168 B2 | 6/2013 | Su |
| 2011/0266194 A1 | 11/2011 | Bau |
| 2011/0284420 A1 | 11/2011 | Sajid |
| 2011/0304962 A1 | 12/2011 | Su |
| 2012/0194448 A1 | 8/2012 | Rothkopf |
| 2013/0083465 A1 | 4/2013 | Motoishi et al. |
| 2013/0270980 A1 | 10/2013 | Hsu |
| 2013/0293430 A1 | 11/2013 | Henty |

FOREIGN PATENT DOCUMENTS

| | | |
|---|---|---|
| CN | 201854808 U | 6/2011 |
| CN | 102188088 A | 9/2011 |
| CN | 202085900 U | 12/2011 |
| CN | 202680896 U | 1/2013 |
| CN | 103162075 A | 6/2013 |
| KR | 10-1243217 B1 | 3/2013 |
| KR | 20-2014-0000989 U | 2/2014 |

OTHER PUBLICATIONS

Chinese Search Report dated Nov. 3, 2017.

*Primary Examiner* — Steve D Agosta
(74) *Attorney, Agent, or Firm* — Cha & Reiter, LLC

(57) ABSTRACT

An accessory device may include a first area having a front surface for mounting a rear surface of an electronic device thereon and being bendable, a second area having a front surface for mounting a rear surface of an electronic device thereon, and a third area disposed to face the second area. The first, second, and third areas may be form a cradle according to bending of the first area.

34 Claims, 15 Drawing Sheets

PROTECTIVE COVER FOR ELECTRONIC DEVICE

CLAIM OF PRIORITY

This application claims the benefit under 35 U.S.C. § 119(a) of a Korean patent application filed in the Korean Intellectual Property Office on Jun. 11, 2014 and assigned Serial No. 10-2014-0071114, the entire disclosure of which is incorporated herein by reference.

TECHNICAL FIELD

The present disclosure relates generally to an accessory, and more particularly, to an accessory device used for an electronic device.

BACKGROUND

Various electronic devices such as a portable phone, an MP3 player, a Portable Multimedia Player (PMP), a tablet Personal Computer (PC), Galaxy Tab, iPad, and an e-book reader have recently been available to users and the users can use various types of content through their electronic devices.

Along with the rapid development of information and communication technology, an electronic device is equipped with various functions including music play, video playback, gaming, camera, scheduling, and dictionary in addition to its traditional functions in order to satisfy various users' demands.

As the electronic device becomes smaller and more lightweight, a user uses the electronic device during movement, carrying it in his or her hand, pocket, or bag. To protect the electronic device safely against loss and breakage that may happen during keeping or carrying it, the electronic device is mounted to an additional accessory device.

In other words, the accessory device protects the electronic device or improves the appearances of the electronic device. Further, the accessory device may include an additional operable device such as a short-range wireless communication device, a Near Field Communication (NFC) circuit, a wireless charging circuit, or the like to thereby support an additional function in the electronic device.

When a user views the display of an electronic device mounted on the conventional accessory device as a stand cradle and a typing cradle, the display should readily come into a convenient field of vision.

To readily bring the electronic device mounted on the standing and typing cradle into a convenient field of vision of the user, there is a need for a device that can adjust the cradling angle of the electronic device.

The above information is presented as background information only to assist with an understanding of the present disclosure. No determination has been made, and no assertion is made, as to whether any of the above might be applicable as prior art with regard to the present disclosure.

SUMMARY

An aspect of the present disclosure is to address at least the above-mentioned problems and/or disadvantages and to provide at least the advantages described below. Accordingly, an aspect of the present disclosure is to provide an accessory device in which an electronic device is mounted and which has a plurality of areas for use as a cradle according to their curves, is readily used as a cradle, and improves the utilization of a cradle for a product.

Another aspect of the present disclosure is to provide an accessory device in which first and second electronic devices may be mounted. The accessory device may have a plurality of areas for use as a cradle according to their curves by means of an engagement member, and may increase the utilization of a cradle by adjusting an angle through movement of the engagement member.

In accordance with an aspect of the present disclosure an accessory device may include a first area having a front surface for mounting a rear surface of an electronic device thereon and being bendable, a second area having a front surface for mounting a rear surface of an electronic device thereon, and a third area disposed to face the second area. The first, second, and third areas may be used as or form a cradle according to bending of the first area.

In accordance with another aspect of the present disclosure, an accessory device may include a first area being bendable, a second area connected to the first area, and a third area facing a rear surface of the second area according to bending of the first area, for using the first and second areas as a cradle. The second and third areas may include an engagement member for generating a force that maintains engagement between the second and third areas, when the second and third areas face each other.

The engagement member may include a magnetic force generator for generating a force that maintains engagement by a magnetic force.

These and other aspects, advantages, and salient features of the disclosure will become apparent and more fully understood to those skilled in the art from the following detailed description, which, taken in conjunction with the annexed drawings, discloses embodiments of the disclosure.

BRIEF DESCRIPTION OF THE DRAWINGS

The above and other aspects, features and advantages of certain embodiments of the present disclosure will be more apparent from the following description taken in conjunction with the accompanying drawings, in which.

Throughout, the drawings, like reference numerals will be understood to refer to like parts, components, and structures.

DETAILED DESCRIPTION

Figure 1:
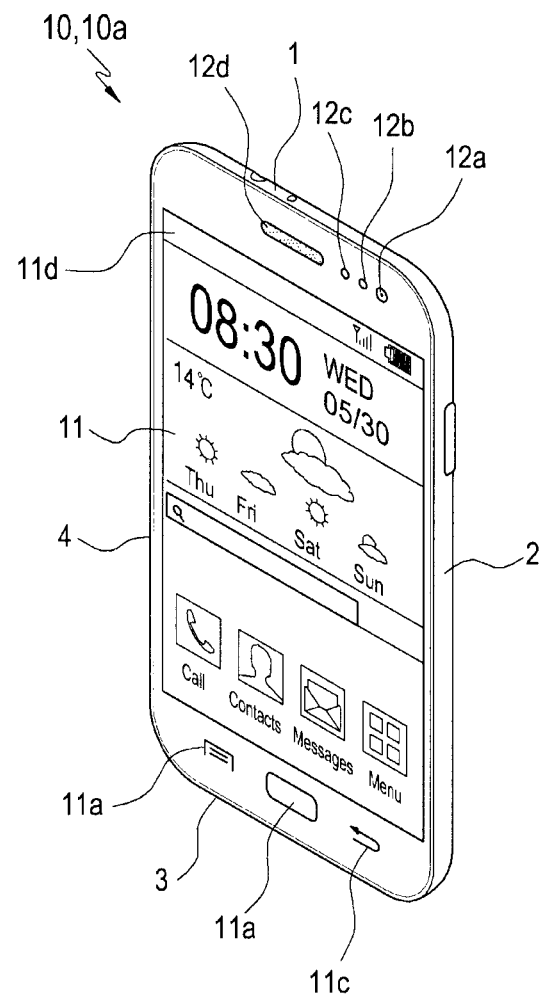
FIG. 1 is a front perspective view of an electronic device according to various embodiments of the present disclosure.

The following description with reference to the accompanying drawings is provided to assist in a comprehensive understanding of embodiments of the disclosure as defined by the claims and their equivalents. It includes various specific details to assist in that understanding but these are to be regarded as merely. Accordingly, those of ordinary skill in the art will recognize that various changes and modifications of the embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of embodiments of the present disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including, for example, tolerances, measurement error, measurement accuracy limitations and other factors known to those of skill in the art, may occur in amounts that do not preclude the effect the characteristic was intended to provide. A 'magnetic member' shall be understood to include a permanent magnet or magnetic material.

An electronic device detachably attached to an accessory device according to various embodiments of the present disclosure is described below. According to an embodiment of the present disclosure, an electronic device may include, for example, a mobile communication terminal operating in compliance with a communication protocol corresponding to any of various communication systems, an information communication device, a multimedia device, and an application of them, such as a video phone, an e-book reader, a laptop Personal Computer (PC), a Netbook computer, a Personal Digital Assistant (PDA), a Portable Multimedia Player (PMP), an MP3 player, a mobile medical equipment, a camera, a wearable device (for example, a Head-Mounted Device (HMD) such as electronic glasses, electronic clothes, an electronic bracelet, an electronic necklace, an electronic appcessory, an electronic tattoo, or a smart watch), etc.

According to some embodiments, an electronic device may be a smart home appliance. The smart home appliance may include, for example, a Television (TV), a Digital Versatile Disk (DVD) player, an audio player, a refrigerator, an air conditioner, a vacuum cleaner, an oven, a micro oven, a washer, an air purifier, a set-top box, a TV box (for example, Samsung HomeSync™, Apple TV™, Google TV™, or the like), a game console, an electronic dictionary, an electronic key, a camcorder, and an electronic picture frame.

According to some embodiments, an electronic device may include, for example, a medical device (for example, a Magnetic Resonance Angiography (MRA) device, a Magnetic Resonance Imaging (MRI) device, a Computed Tomography (CT) device, an imaging device, an ultrasonic device, or the like), a navigation device, a Global Positioning System (GPS) receiver, an Event Data Recorder (EDR), a Flight Data Recorder (FDR), an automotive infotainment device, a naval electronic device (for example, a naval navigation device, a gyrocompass, or the like), an avionic electronic device, a security device, an in-vehicle head unit, an industrial or consumer robot, an Automatic Teller Machine (ATM) in a financial facility, a Point Of Sales (POS) device in a shop, and the like.

According to some embodiments, an electronic device may include, for example, furniture, part of a building/structure, an electronic board, an electronic signature receiving device, a projector, and various measuring devices (for example, water, electricity, gas or electro-magnetic wave measuring devices), which include communication functionality.

An electronic device according to various embodiments of the present disclosure may be one or a combination of two or more of the foregoing devices. Also, an electronic device according to various embodiments of the present disclosure may be a flexible device. In addition, it will be apparent to one having ordinary skill in the art that an electronic device according to the present disclosure is not limited to the foregoing devices.

Figure 2:
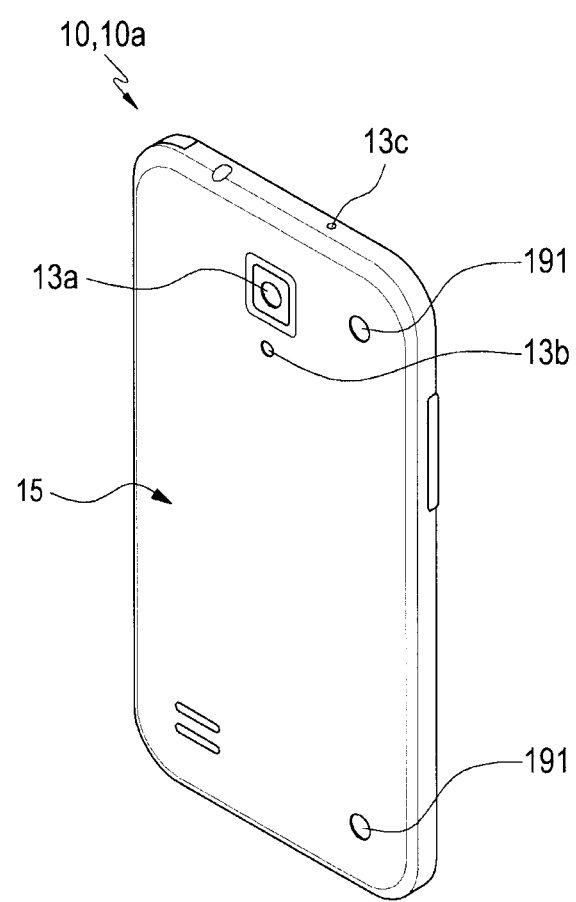
FIG. 2 is a rear perspective view of the electronic device according to various embodiments of the present disclosure.

FIG. 1 is a front perspective view illustrating the front surface of an electronic device and FIG. 2 is a rear perspective view illustrating the rear surface of the electronic device. The electronic device may be a smart phone or a tablet PC. With reference to FIGS. 1 and 2, the structure of an electronic device such as a smart phone will be described below.

Referring to FIG. 1, a touch screen 11 may be disposed at the center of the front surface of an electronic device 10 or 10a. The touch screen 11 may occupy the entirety of the front surface of the electronic device 10 or 10a. In the example of FIG. 1, a main home screen is displayed on the touch screen 11. The main home screen may be the first screen displayed on the touch screen 11, when the electronic device 10 or 10a is powered on. If the electronic device 10 or 10a has different home screens on a plurality of pages, the main home screen may be the first of the home screens on the plurality of pages. Short icons for executing frequently used applications, a main menu switch key, time, weather, and the like may be displayed on a home screen. The main menu switch key may be used to display a menu screen on the touch screen 11. A status bar 11d indicating states such as a battery charged state, a received signal strength, and a current time may be formed at the top of the touch screen 11. A home key 11a, a menu button 11b, and a back button 11c may be formed at the bottom of the touch screen 11.

The home key 11a may be used to display the main home screen on the touch screen 11. For example, when the home button 11a is touched with a home screen other than the main home screen or a menu screen displayed on the touch screen 11, the main home screen may be displayed on the touch screen 11. When the home key 11a is touched during execution of an application on the touch screen 11, the main home screen may be displayed on the touch screen 11. Further, the home key 11a may be used to display a recently used application or a task manager on the touch screen 11. The menu button 11b may provide link menus that available or displayed on the touch screen 11. The link menus may include a widget add menu, a background screen change menu, a search menu, an edit menu, and an environment setting menu. The back button 11c may be used to display a screen executed previously to an on-going screen or end the most recently used application.

According to various embodiments of the present disclosure, a first camera 12a, an illumination sensor 12b, or a proximity sensor 12c may be included in an upper end area of the front surface of the electronic device 10 or 10a. A second camera 13a, a flash 13b, or a speaker 13c may be included on the rear surface of the electronic device 10. A battery pack may be detachably attached to the electronic device 10, and in that case the rear surface of the electronic device 10 may be a detachable battery cover 15.

The first and second electronic devices 10 and 10a will be described hereinbelow as electronic devices. The first electronic device 10 is any of the afore-described laptop computer, Netbook computer, smart phone, tablet PC, Galaxy Tab, and iPad, and the second electronic device 10a is a keyboard.

An accessory device 100 may include a protection cover to protect the first and second electronic devices 10 and 10a. While a protection cover is taken as an example of the accessory device 100, it is to be understood that the accessory device 100 is not limited to a protection cover. In other words, as far as it is a cover that protects the first and second electronic device 10 and 10a, any device may be applied as the accessory device 100. According to various embodiments of the present disclosure, the accessory device 100 may be applied to surfaces of the first and second electronic devices 10 and 10a.

Figure 3:
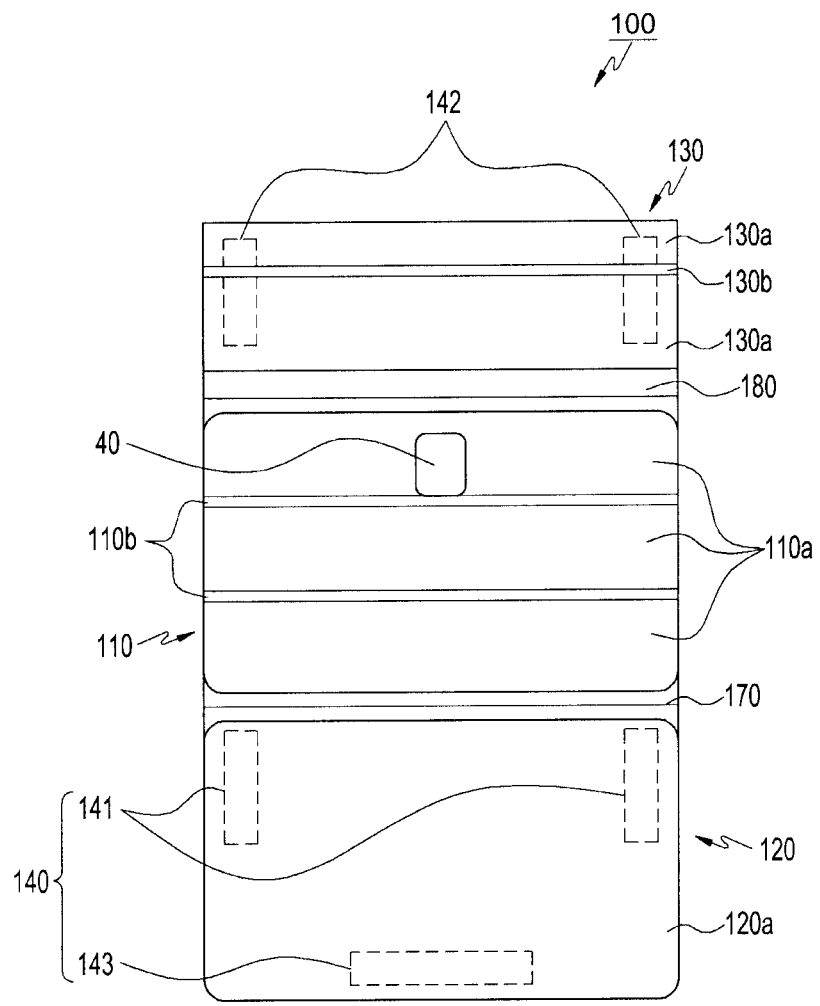
FIG. 3 is a rear view of an accessory device according to various embodiments of the present disclosure.
Figure 4:
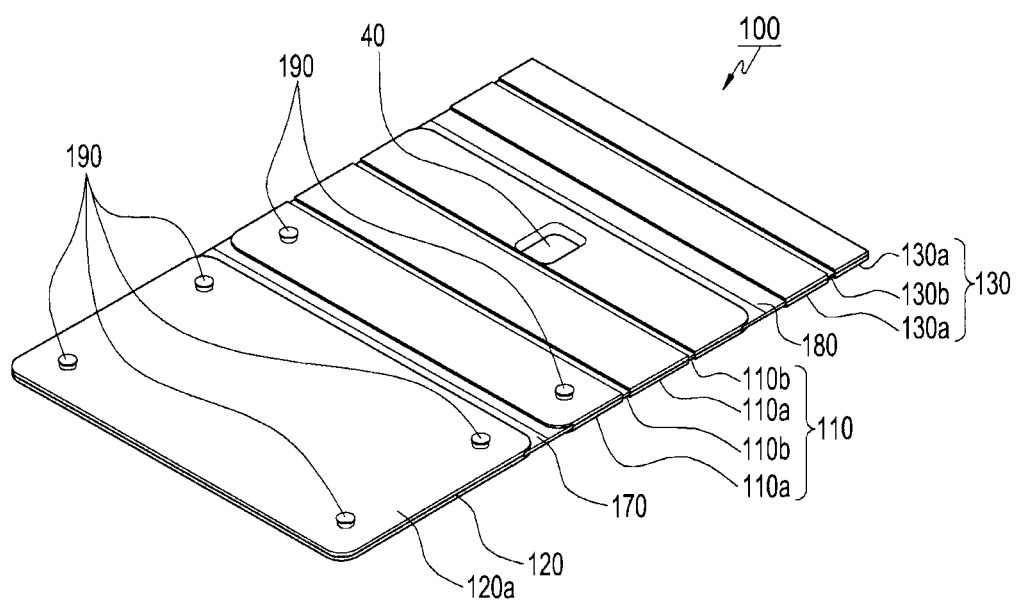
FIG. 4 is a perspective view illustrating the front surface of the accessory device according to various embodiments of the present disclosure.

FIG. 3 is a rear view illustrating the rear surface of the accessory device 100 according to various embodiments of the present disclosure, and FIG. 4 is a perspective view illustrating the front surface of the accessory device 100 according to various embodiments of the present disclosure.

With reference to FIGS. 3 and 4, the structure of the accessory device 100 that protects the first and second electronic devices (10 and 10a in FIG. 1) will be described. The accessory device 100 may include first, second, and third areas 110, 120, and 130 and an engagement member 140. The rear surface of the first electronic device 10 may be mounted on the front surface of the first area 110, while the first area 110 may be bent so as to serve as a cradle. The rear surface of the second electronic device 10a may be mounted on the front surface of the second area 120 which is connected to the first area 110. As the first area 110 is bent, the third area 130 may face the rear surface of the second area 120, connected to the first area 110 so that the first and second areas 110 and 120 may be used as a cradle.

Further, when the first and second areas 110 and 120 are used as a cradle, a cradling angle of the cradle may be adjusted by moving the third area 130.

As described above, the engagement member 140 is configured in the second and third areas 120 and 130 so that the first and second areas 110 and 120 may be used as a cradle by positioning the second and third areas 120 and 130 face to face and at the same time, generating a magnetic force or a cradling angle of the cradle may be adjusted by moving the third area 130. Therefore, the accessory device 100 may be used readily as a stand cradle and a typing cradle and may be easily adjusted to an angle at which the accessory device 100 comes into a convenient field of vision of the user.

Figure 7A:
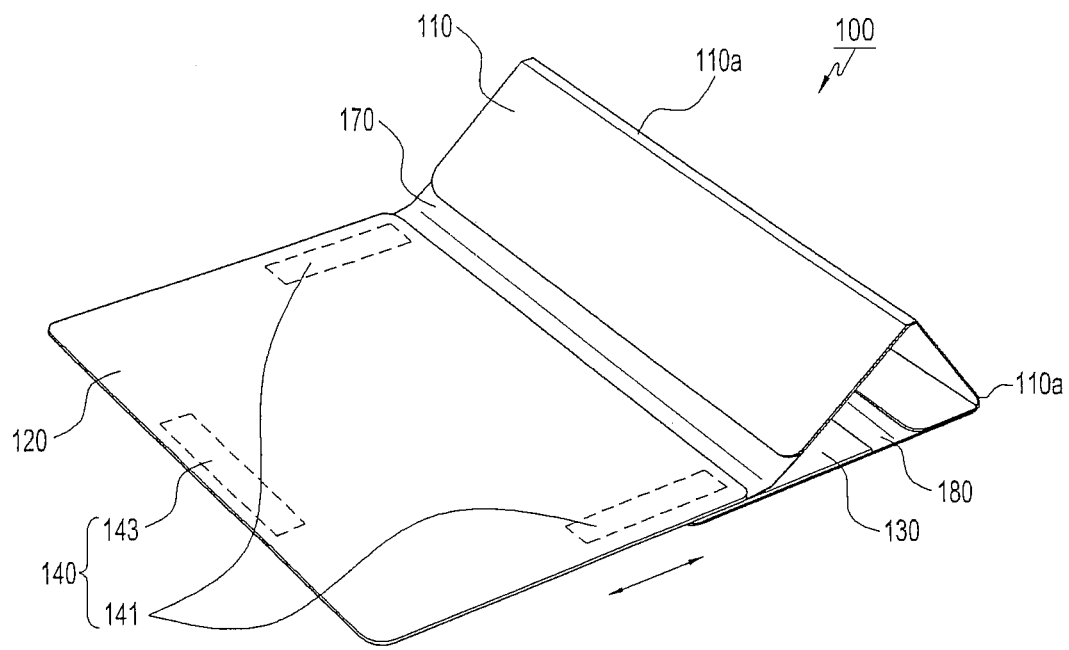
FIG. 7A is a perspective view illustrating an operation state of a magnetic force generator in the accessory device according to various embodiments of the present disclosure.
Figure 7B:
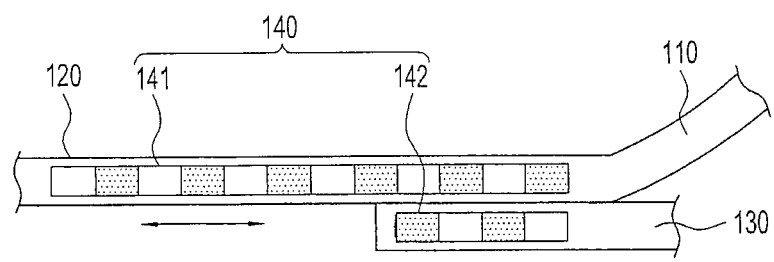
FIG. 7B is a side sectional view illustrating the operation state of the magnetic force generator in the accessory device according to various embodiments of the present disclosure.
Figure 8A:
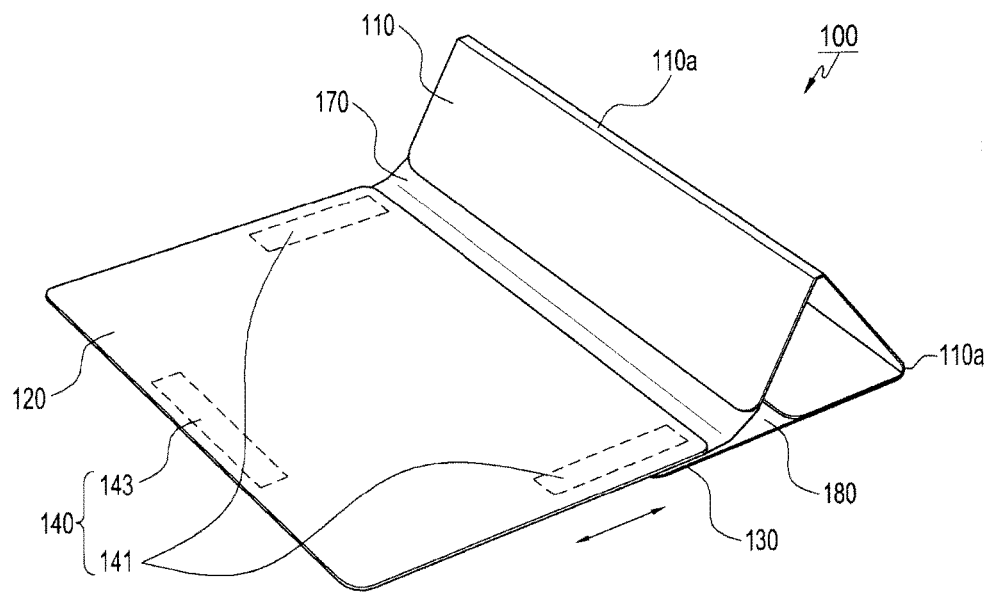
FIG. 8A is a perspective view illustrating a state in which a cradling angle is adjusted using the magnetic force generator in the accessory device according to various embodiments of the present disclosure.
Figure 8B:
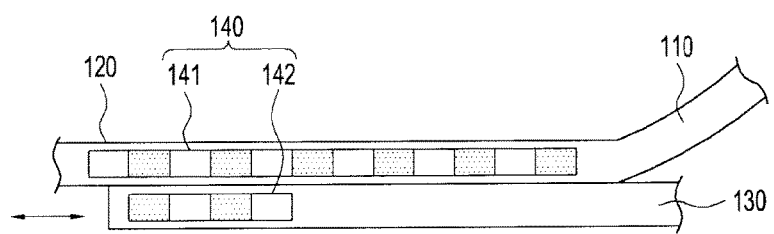
FIG. 8B is a side sectional view illustrating a state in which a cradling angle is adjusted using the magnetic force generator in the accessory device according to various embodiments of the present disclosure.

The engagement member 140 includes a magnetic force generator. The magnetic force generator 140 will be described below in more detail. FIG. 7A is a perspective view of an operation state of the magnetic force generator 140 in the accessory device according to the present disclosure. FIG. 7B is a side sectional view illustrating the operation state of the magnetic force generator 140 in the accessory device according to the present disclosure. FIG. 8A is a perspective view illustrating a state in which a cradling angle is adjusted using the magnetic force generator 140 in the accessory device according to the present disclosure. FIG. 8B is a side sectional view illustrating the state in which a cradling angle is adjusted using the magnetic force generator 140 in the accessory device according to the present disclosure.

Referring to FIGS. 3, 7A, and 7B, the magnetic force generator 140 may include one or more first magnet members 141, one or more second magnet members 142, and a third magnet member 143. The first magnet members 141 are provided in the second area 120 to generate a magnetic force, facing the second magnet members 142. The second magnet members 142 may be provided in the third area 130 in such a manner that they may be moved to face the first magnet members 141 and adjust the cradling angle of the cradle by a magnetic force generated during the movement. The third magnet member 143 may be provided in the second area 120 to open or close the first, second, and third areas 110, 120, and 130 by a magnetic force generated by contact with the second magnet members 142.

The third area 130 may face the rear surface of the second area 120 by bending and rotating the first area 110 simultaneously. At the same time, the second magnet members 142 of the third area 130 may be attached to the first magnet members 141 of the second area 120 by a magnetic force. When the third area 130 is moved in this state, the second magnet members 142 of the third area 130 may also moved.

When the second magnet members 142 stop at a moved position, the second magnet members 142 are fixedly attached to the first magnet members 141 by a magnetic force. In this manner, a cradling angle of the first area 110 may be adjusted. In other words, as the second magnet members 142 of the third area 130 move along the rear surface of the second area 120, the second magnet members 142 are attached to or removed from the first magnet members 141 of the second area 120 by a magnetic force. Thus, the cradling angle of the first area 110 may be adjusted.

Figure 9A:
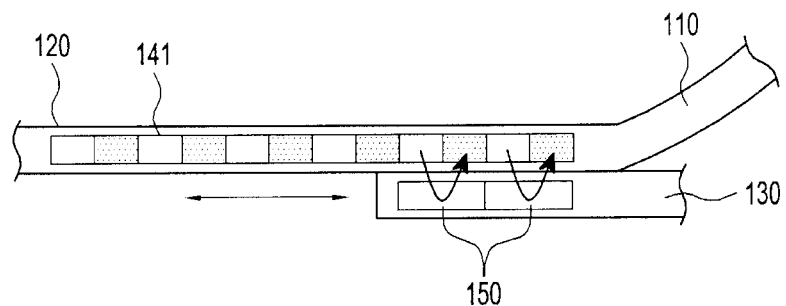
FIG. 9A is a side sectional view illustrating an operation state of another embodiment of a magnetic force generator with a metal plate as a first magnet member in the accessory device according to various embodiments of the present disclosure.
Figure 9B:
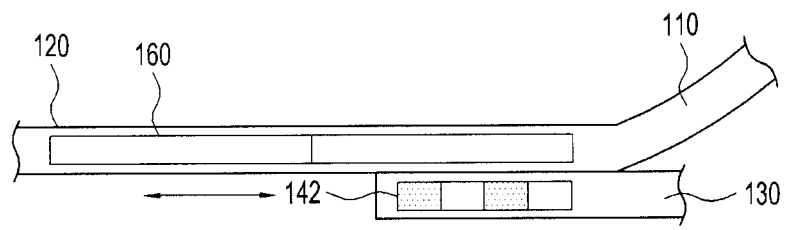
FIG. 9B is a side sectional view illustrating an operation state of another embodiment of a magnetic force generator with a metal plate as a second magnet member in the accessory device according to various embodiments of the present disclosure.

FIG. 9A is a side sectional view illustrating an operation state of another embodiment of the magnetic force generator 140 with metal plates as the first magnet members 141 in the accessory device according to various embodiments of the present disclosure. FIG. 9B is a side sectional view illustrating an operation state of another embodiment of the magnetic force generator 140 with metal plates as the second magnet members 142 in the accessory device according to various embodiments of the present disclosure.

Referring to FIG. 9B, where the second magnet members 142 are permanent magnets with repeated N and S poles, the first magnet members 141 may be metal plates 160. On the other hand, referring to FIG. 9A, where the first magnet members 141 are permanent magnets with repeated N and S poles, the second magnet members 142 may be metal plates 150. That is, the first magnet members 141 may be configured selectively as the metal plates 160 or permanent magnets. Likewise, the second magnet members 142 may be configured selectively as the metal plates 150 or permanent magnets.

In other words, either of the first and second magnet members 141 and 142 may be magnets or the metal plates 150 or 160 so that the first and second magnet members 141 and 161 may attract each other by a magnetic force.

The following description will be given in the context of the magnetic force generator 140 with the first magnet members 141 being permanent magnets and the second magnet members 142 being metal plates.

As the first area 110 is bent and rotated simultaneously, the third area 130 faces the rear surface of the second area 120. At the same time, the metal plates 150 of the third area 130 are attracted to the permanent magnets of the second area 120 by a magnetic force. When the third area 130 is moved in this state, the metal plates 150 of the third area 130 are also moved. The metal plates 150 are fixedly attached to the permanent magnets of the second area 120 by a magnetic force. Thus, the cradling angle of the first area 110 may be adjusted.

Figure 10:
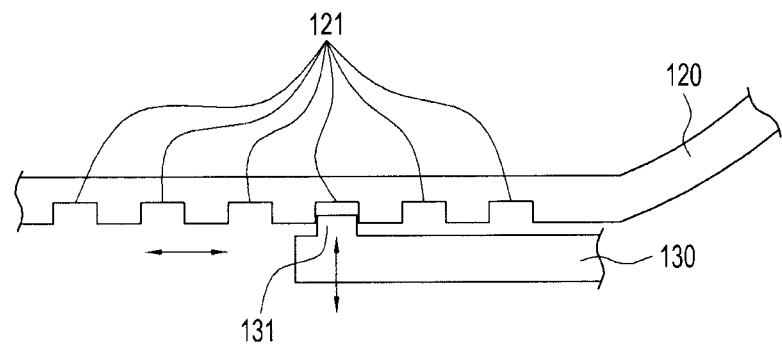
FIG. 10 is a side sectional view illustrating engagement members in the accessory device according to various embodiments of the present disclosure.

FIG. 10 is a side sectional view illustrating another embodiment of adjusting a cradling angle of a cradle, when the first and second areas 110 and 120 are used as the cradle.

Referring to FIG. 10, the second area 120 is provided with a plurality of engagement members 121 so that the cradle may be used and its cradling angle may be adjusted depending on whether a protrusion 131 of the third area 130 are inserted or removed. The engagement members 121 may have engagement grooves, which the protrusion 131 may be inserted into or removed from. That is, the third area 130 may face the rear surface of the second area 120 by bending and rotating the first area 110 simultaneously and at the same time, the protrusion 131 of the third area 130 is inserted into an engagement member 121 of the second area 120. Thus, the third area 130 and the second area 120 are fixedly engaged to thereby enable the first area 110 to act as a cradle. If the cradling angle of the first area 110 is adjusted, the protrusion 131 of the third area 130 is removed from the engagement member 121 of the second area 120, moved, and then engaged with another engagement member 121 of the second area 120. The cradling angle of the first area 110 is changed by as much as a distance for which the third area 130 has moved.

The first, second, and third areas 110, 120, and 130 may include two or more reinforcement portions 110a, 120a, and 130a, and connection portions 110b and 130b. The reinforcement portions 110a, 120a, and 130a are configured to bendably support the first, second, and third areas 110, 120, and 130. The connection portions 110b and 130b may be interposed between the reinforcement portions 110a, 120a, and 130a to bendably interconnect the reinforcement portions 110a, 120a, and 130a. The connection portions 110b and 130b may be formed into connection grooves to allow bending of the first and third areas 110 and 130.

In the embodiment of the present disclosure, the connection portions 110b and 130b may be provided in the first and third areas 110 and 130, respectively.

As illustrated in FIGS. 3 and 4, first and second rotation connectors 170 and 180 may be interposed between the first, second, and third areas 110, 120, and 130 to rotate the first, second, and third areas 110, 120, and 130. Specifically, the first rotation connector 170 may be interposed between the first and second areas 110 and 120 to allow rotation of the first area 110. The second rotation connector 180 may be interposed between the first and third areas 110 and 130 to allow rotation of the third area 130.

One or more engagement portions 190 or detachable members (not shown) are provided in the first and second areas 110 and 120 so that the first and second electronic devices (10 and 10a in FIG. 2) may be attached to or removed from the accessory device 100.

The engagement portions 190 may be engagement connectors configured to be inserted into or removed from a plurality of connectors (191 in FIG. 2) of the first and second electronic devices (10 and 10a in FIG. 2) and to electrically connect the first and second electronic devices (10 and 10a in FIG. 2).

That is, the engagement portions 190 of the first and second areas 110 and 120 may contact and engage with the connectors (191 in FIG. 2) of the first and second electronic devices by forced insertion and may electrically connect the first and second electronic devices, for transmission and reception of electrical signals. For example, the first electronic device 10 may be a touch screen, the second electronic device 10a may be a keyboard, and a signal from the keyboard may be provided to the first electronic device 10 through the engagement portions 190 and the connectors (191 in FIG. 2).

The engagement portions 190 of the first and second areas 110 and 120 are engagement connectors protruding outward, and the connectors 191 of the first and second electronic devices (10 and 10a in FIG. 2) may be formed to the same height as cases of the first and second electronic devices. That is, the connectors 191 are not exposed outward from the cases of the first and second electronic devices.

Each of the connectors 191 includes a body having an opening, a plate movable inside the opening, and a restoring member. The body, the plate, and the restoring member are not shown in a drawing.

When the connectors (element 191 shown in FIG. 2) of the first and second electronic devices are forcedly inserted into the engagement portions 190, the engagement portions 190 and the plates contact and move into the openings. Thus, the engagement portions 190 and the connectors 191 are engaged. If the engagement portions 190 are removed from the connectors 191, the plates are restored to their original positions by an elastic force of the restoring members inside the openings.

The detachable members (not shown) may be detachable hooks detachably attached along the outer peripheries of the first and second electronic devices.

That is, the detachable members (not shown) may be configured to fit into or be removed from the first and second electronic devices, around the peripheries of the first and second electronic devices.

Figure 11:
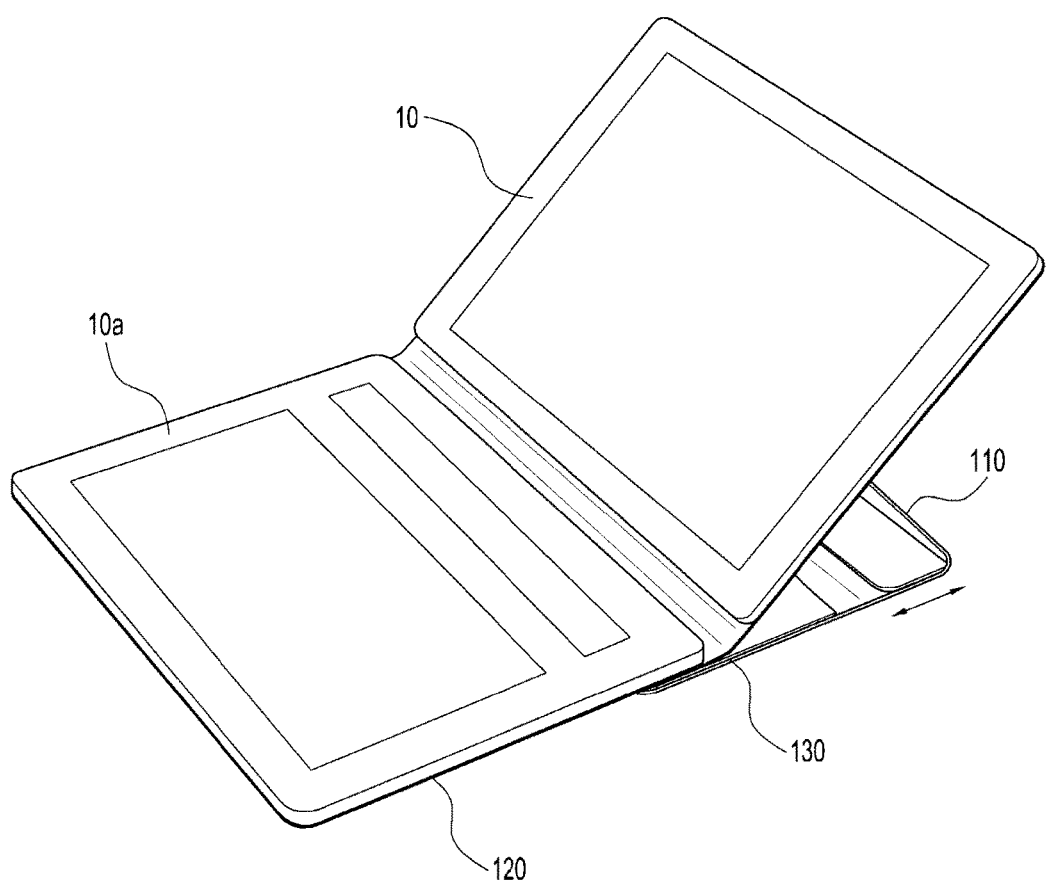
FIG. 11 is a perspective view illustrating a use state of the accessory device according to various embodiments of the present disclosure.
Figure 12:
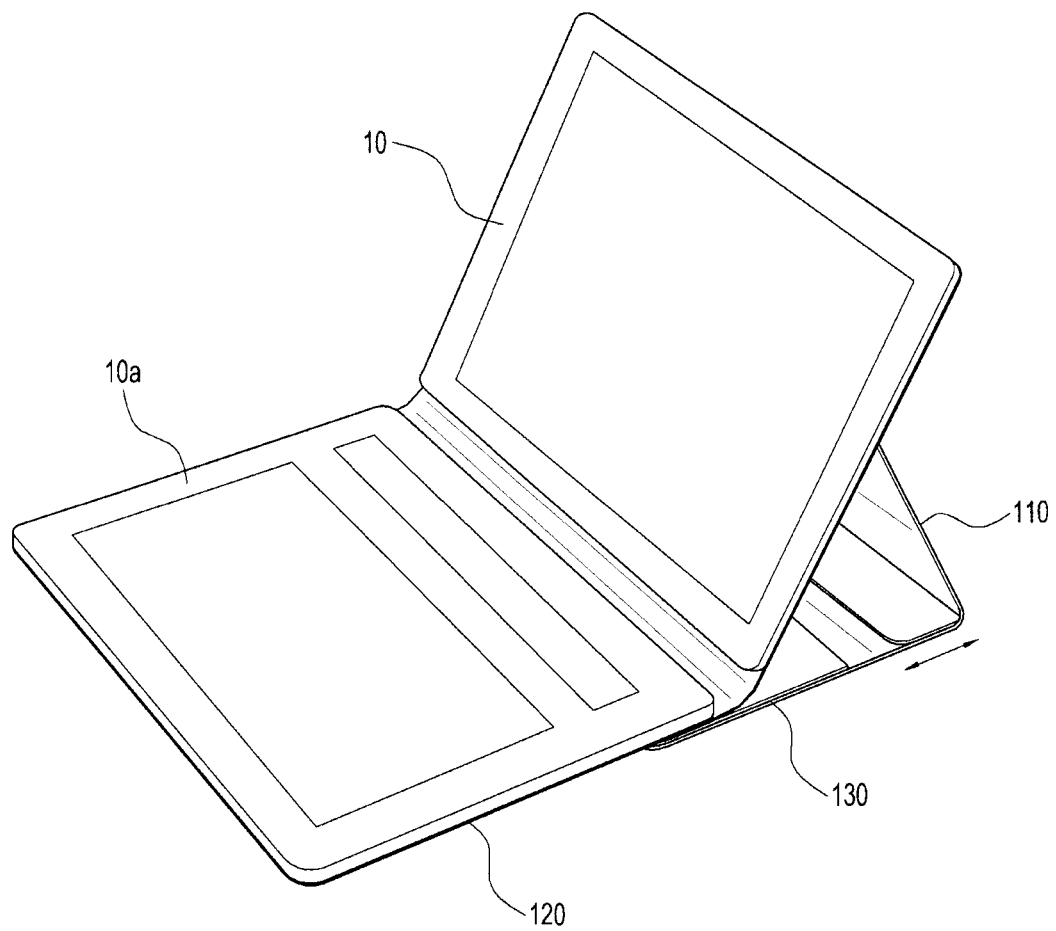
FIG. 12 is a perspective view illustrating a state in which a cradling angle is adjusted in the accessory device according to various embodiments of the present disclosure.

As illustrated in FIGS. 11 and 12, the first, second, and third areas 110, 120, and 130 may be used as a stand cradle and/or a typing cradle according to their usages.

In an embodiment of the present disclosure, the first electronic device 10 may be mounted in the first area 110 and a keyboard is mounted in the second area 120. That is, the first and second areas 110 and 120 are used as a stand cradle and a typing cradle.

Further, the first and second areas 110 and 120 are detachably attached to the rear surfaces of the first and second electronic devices, respectively.

The first area 110 is detachably engaged with the rear surface of the first electronic device 10 and the second area 120 may include one of a keyboard, a cradle, a battery cover, a protection cover, and a flip cover. The second area 120 may be applied to a device other than the above devices.

Also, the first area 110 is detachably engaged with the rear surface of the first electronic device 10 and the second area 120 may be integrated with the second electronic device 10*a*.

Further, each of the first and second electronic devices 10 and 10*a* may include or may be configured as one of a keyboard, a sensor pattern, a conductive pattern, an antenna, a wireless charging circuit, a display, a battery cover, a protection cover, and a flip cover.

An exposure hole 40 is formed in the first and second areas 110 and 120 in order to expose one of a camera module and a microphone provided in the first and second electronic devices (elements 10 and 10*a* shown in FIGS. 1 and 2).

Figure 5:
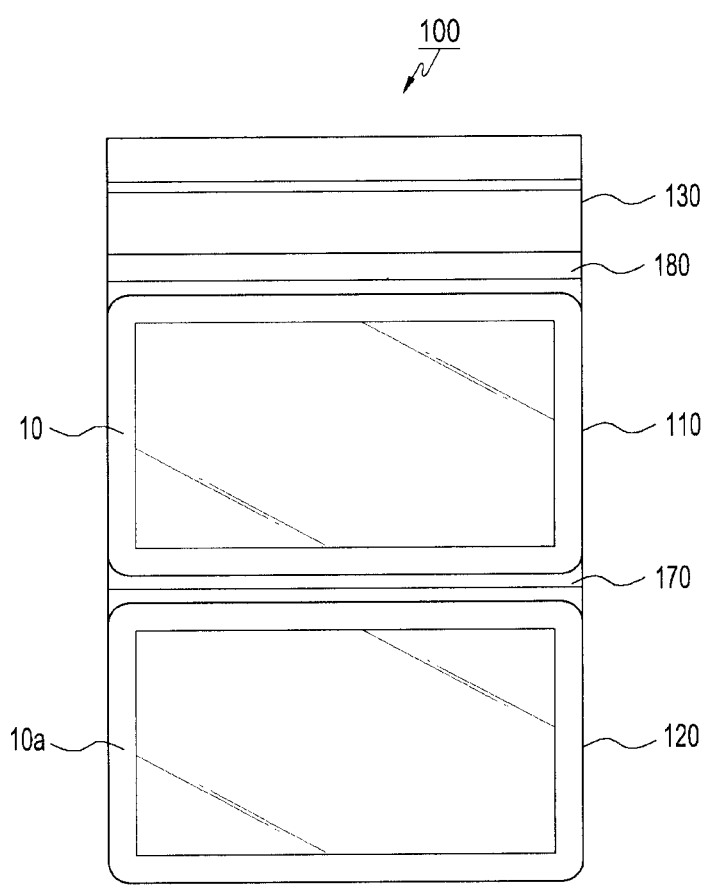
FIG. 5 is a front view illustrating an open state of first and second electronic devices attached to the accessory device according to various embodiments of the present disclosure.

Referring to FIG. 5, in regard to assembly of the accessory device 100, the accessory device 100 includes the first, second, and third areas 110, 120, and 130, the first rotation connector 170 is interposed between the first and second areas 110 and 120, and the second rotation connector 180 is interposed between the first and third areas 110 and 130. The first electronic device 10 is mounted on the first area 110. Herein, the connectors (element 191 shown in FIG. 2) of the first electronic device 10 are engaged with the engagement portions 190 of the first area 110, in electrical connection. A keyboard may be integrated with the second area 120.

An operation of the accessory device 100 in this state will be described in greater detail.

Figure 6:
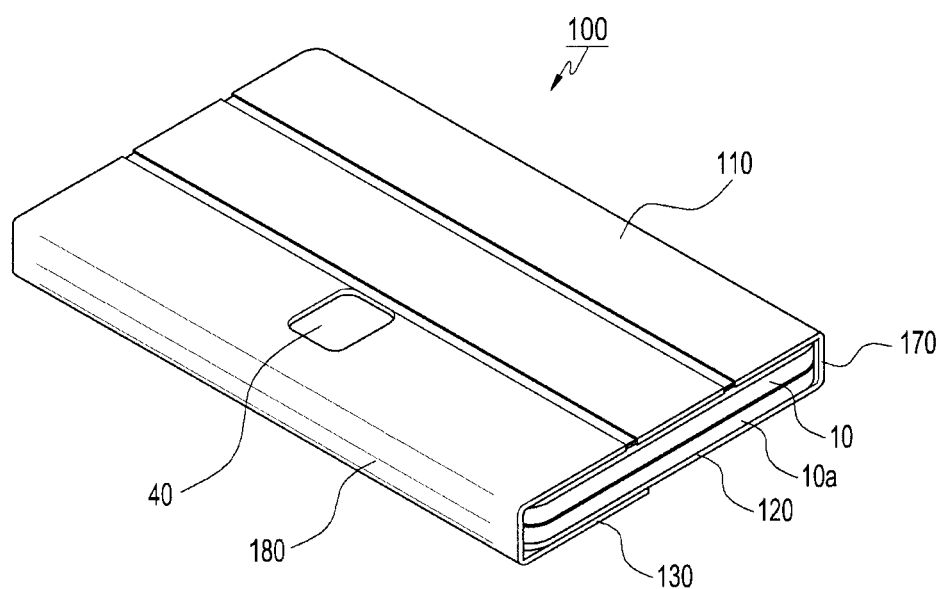
FIG. 6 is a perspective view illustrating a closed state of the first and second electronic devices attached to the accessory device according to various embodiments of the present disclosure.

FIG. 6 is a perspective view illustrating a closed state in which the first electronic device 10 is mounted on the first area 110 and a keyboard is integrally provided in the second area 120.

As illustrated in FIG. 6, the first and second areas 110 and 120 are rotated by means of the first rotation connector 170. Thus, the first electronic device 10 and the keyboard may be folded toward each other, such that they are face-to-face. In this state, the third area 130 may be rotated by the second rotation connector 180 to face the rear surface of the second area 120.

Since the second area 120 may provided with the third magnet member 143 that opens or closes the first, second, and third areas 110, 120, and 130 by attaching to or detaching from the second magnets 142 of the third area 130 by a magnetic force, when the third area 130 is rotated by the second rotation connector 180, the second magnet members 142 of the third area 130 may also rotate and thus fixedly contact the third magnet member 143 of the second area 120 by a magnetic force.

Accordingly, the first, second, and third areas 110, 120, and 130 may be kept closed.

When the first, second, and third areas 110, 120, and 130 are opened, the first and second rotation connectors 170 and 180 are rotated to thereby open the first, second, and third areas 110, 120, and 130, as illustrated in FIG. 5. Herein, the second magnet members 142 of the third area 130 are removed from the third magnet member 143 of the second area 120. Then, the first, second, and third areas 110, 120, and 130 may be even on a plane.

The third area 130 may be rotated by the second rotation connector 180 to face the rear surface of the second area 120. The second magnet members 142 of the third area 130 may be attached to the first magnet members 141 of the second area 120 by a magnetic force.

When the third area 130 is rotated, the first area 110 may be bent by the connection portions 110*b* of the first area 110. Since the connection portions 110*b* are connection grooves for bending the first area 110, when the third area 130 is rotated, the first area 110 may also rotate and/or be bent by the connection portions 110*b*. The connection portions 110*b* bend the first area 110 to below the center of the first area 110.

That is, as illustrated in FIG. 11, the first area 110 may be shaped into a triangle by the connection portions 110*b* so that the first area 110 may be used as a cradle. The second magnet members 142 of the third area 130 may be attached to the first magnet members 141 of the second area 120 by a magnetic force. Thus, the first area 110 may be formed into a cradle and may thus cradle the first electronic device 10 mounted on the first area 110.

That is, the first area 110 may be formed into a stand cradle and the first electronic device 10 mounted on the first area 110 may be used in stand mode. At the same time, the second area 120 may be placed on a plane so as to be used as a typing cradle.

Accordingly, the first area 110 with the first electronic device 10 mounted on it may be used as a stand cradle and the second area 120 with the keyboard may be used as a typing cradle.

Thus, a user may type on the keyboard and view a video on the first electronic device 10. In the stand mode, an appropriate angle of vision should be secured when the user views the first electronic device 10. To secure the appropriate angle of vision, the cradling angle of the stand cradle should be changed. When the third area 130 is moved toward the rear surface of the second area 120, the second magnet members 142 of the third area 130 also move along the first magnet members 141 of the second area 120. That is, the user adjusts the angle of vision appropriately by pushing or pulling the second magnet members 142 of the third area 130 and then fixedly attaches the second magnet members 142 to the first magnet members 141 of the second area 120. The user may get an intended angle of vision by adjusting the cradling angle in the stand mode of the first electronic device 10.

Further, when the cradling angle is changed using the first, second, and third areas 110, 120, and 130, the first and second electronic devices (10 and 10*a* in FIG. 1) sense the changed cradling angle through sensors of the first and second electronic devices, generate signals corresponding to the sensed angle, and apply the signals to a controller (not shown) of the first and second electronic devices. The controller may adjust the display brightness of the first and second electronic devices according to the sensed angle.

When a user views a display of an electronic device, a conventional accessory device (not shown) may be in a fixed position such that an angle of vision convenient to the user cannot be set.

To overcome this shortcoming, with the first electronic device (element 10 shown in FIG. 1) on the first area 110 and a keyboard on the second area, the accessory device 100 may be used as a cradle according to bending of the first area 110 or a cradling angle of the cradle may be adjusted by moving the accessory device 100 according to the embodiment of the present disclosure. Therefore, the first, second, and third areas 110, 120, and 130 may serve as a cradle. Further, when the accessory device 100 is used in stand mode and typing mode, a cradling angle may be changed within a convenient field of vision, thereby increasing the utilization of the accessory device 100.

Now, a description will be given of an accessory device 200 according to another various embodiments of the present disclosure with reference to FIGS. 13 and 14.

Figure 13:
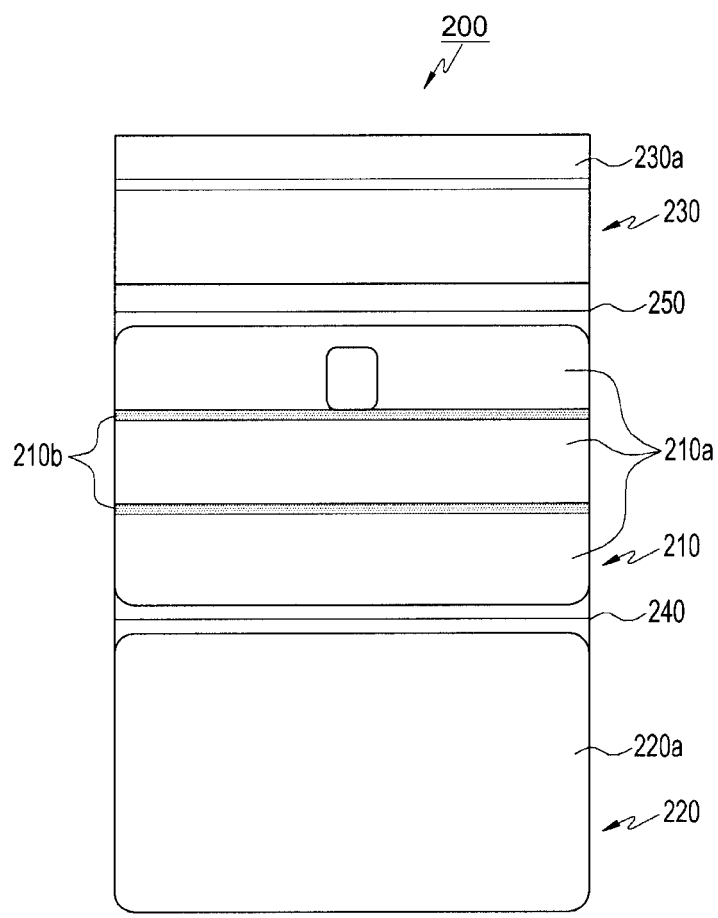
FIG. 13 is a rear view of a surface of another embodiment of an accessory device according to various embodiments of the present disclosure.
Figure 14:
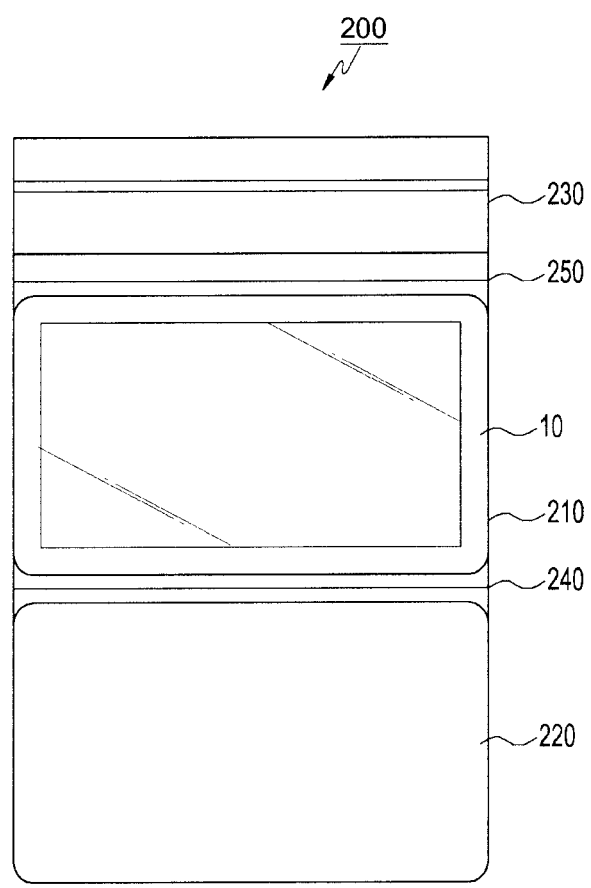
FIG. 14 is a front view illustrating the front surface of another embodiment of an accessory device according to various embodiments of the present disclosure.

FIG. 13 is a rear view illustrating the rear surface of another embodiment of an accessory device according to various embodiments of the present disclosure, and FIG. 14 is a front view illustrating the front surface of another embodiment of an accessory device according to various embodiments of the present disclosure.

Referring to FIGS. 13 and 14, the structure of the accessory device 200 will be described below. The accessory device 200 includes first, second, and third areas 210, 220, and 230. The rear surface of the electronic device (10 in FIG. 1) is mounted on the front surface of the first area 210, while the first area 210 is bent to serve as a cradle. The second area 220 may be placed on the front surface of the electronic device to protect the electronic device, while being connected to the first area 210. The third area 230 faces the rear surface of the second area 220 according to the curvature of the first area 210, in connection to the first area 210 so that the first and second areas 210 and 220 may be used as a cradle.

Further, the third area 230 is configured so that when the first and second areas 210 and 220 are used as a cradle, a cradling angle of the cradle may be adjusted by moving the third area 230 without a magnetic force of a magnet.

As described above, the accessory device 200 may be configured in such a manner that the second and third areas 220 and 230 may face each other to serve as a cradle and a cradling angle of the cradle may be adjusted by moving the third area 230. Therefore, the accessory device 200 is easily used as a stand cradle and a typing cradle and facilitates adjustment of an angle within a field of vision convenient for use.

The second area 220 is provided with a plurality of engagement members (121 in FIG. 10) with which to adjust the cradling angle of the cradle according to whether the engagement members are engaged with or removed from a protrusion (131 in FIG. 10) formed in the third area 230. The engagement members are formed into engagement grooves, which the protrusion (131 in FIG. 10) may be engaged into or removed from.

That is, as the first area 210 is bent and rotated at the same time, the third area 230 faces the rear surface of the second area 220 and, at the same time, the protrusion of the third area 230 is inserted into an engagement member of the second area 220. Thus the third area 230 and the second area 220 are fixed and cradle the first area 210. When a cradling angle of the first area 210 is adjusted, the protrusion of the third area 230 may be removed from the engagement member (121 in FIG. 10) of the second area 220 and engaged with another engagement member (121 in FIG. 10) of the second area 220. The cradling angle of the first area 210 may be changed by as much as a distance for which the third area 230 has moved.

As described before with reference to FIG. 13, the first, second, and third areas 210, 220, and 230 include two or more reinforcement portions 210a, 220a, and 230a and connection portions 210b. The reinforcement portions 210a, 220a, and 230a are configured to support the first, second, and third areas 210, 220, and 230 bendably. The connection portions 210b may be interposed between the reinforcement portions 210a to interconnect the reinforcement portions 210a bendably. The connection portions 210b may be formed into connection grooves to bend the first area 210.

As illustrated in FIG. 13, first and second rotation connectors 240 and 250 are provided between the first, second, and third areas 210, 220, and 230 in order to enable rotation of the first, second, and third areas 210, 220, and 230. That is, the first rotation connector 240 is provided between the first and second areas 210 and 220 and thus enables rotation of the first area 210, and the second rotation connector 250 is provided between the first and third areas 210 and 230 and thus enables rotation of the third area 230.

One or more engagement portions (element 190 shown in FIG. 4) or detachable members (not shown) may be provided in the first area 210 in order to attach or remove the electronic devices (elements 10 and 10a shown in FIG. 1). The engagement portions (element 190 shown in FIG. 4) may be formed into engagement connectors to be engaged with or removed from the plurality of connectors (element 191 shown in FIG. 2) of the electronic devices, while electrically connecting to the electronic devices.

The engagement portions (element 190 shown in FIG. 4) and the detachable members have been described before in the foregoing various embodiments of the present disclosure and thus will not described further herein.

The first, second, and third areas 210, 220, and 230 may be used as a stand cradle and/or a typing cradle.

In the embodiment of the present disclosure, the electronic device (elements 10 or 10a) is mounted on the first area 210 and a keyboard is mounted on the second area 220. In other words, the first and second areas 210 and 220 are used as a stand cradle and a typing cradle.

Further, the first area 210 is detachably attached to the rear surface of the electronic device (element 10 shown in FIG. 1) and the second area 220 may include one of another electronic device (element 10a shown in FIG. 1), a keyboard, a keyboard, a sensor pattern, a conductive pattern, an antenna, a wireless charging circuit, a display, a battery cover, a protection cover, a cradle, and a flip cover. The second area 220 may be applied to a device other than the above devices.

Also, the first area 210 is detachably engaged with the rear surface of the electronic device 10 and the second area 120 may be integrated with the other electronic device 10a.

Further, the other electronic devices may include or may be configured as one of a keyboard, a sensor pattern, a conductive pattern, an antenna, a wireless charging circuit, a display, a battery cover, a protection cover, and a flip cover.

The exposure hole (element 40 shown in FIG. 3) is formed in the first and second areas 210 and 220 in order to expose one of a camera module or a microphone provided in the first and second electronic devices (elements 10 and 10a shown in FIGS. 1 and 2).

Referring to FIG. 14, in regard to assembly of the accessory device 200, the accessory device 200 includes the first, second, and third areas 210, 220, and 230, the first rotation connector 240 is interposed between the first and second areas 210 and 220, and the second rotation connector 250 is interposed between the first and third areas 210 and 220. An electronic device is mounted on the first area 210. Herein, the connectors (element 191 shown in FIG. 2) of the electronic device are engaged with the engagement portions (element 190 shown in FIG. 4) of the first area 210, in electrical connection.

An operation of the accessory device 200 in this state will be described in greater detail.

The first and second areas 210 and 220 are rotated by means of the first rotation connector 240. Thus, the front surface of the second area 220 is positioned on the front surface of the electronic device. In this state, the third area 230 may rotated by the second rotation connector 250 to thereby face the rear surface of the second area 220.

Accordingly, the first, second, and third areas 210, 220, and 230 may be kept closed.

When the first, second, and third areas 210, 220, and 230 are opened, the first and second rotation connectors 240 and 250 are rotated to open the first, second, and third areas 210, 220, and 230, as illustrated in FIG. 14.

Herein, the third area 230 may be rotated by the second rotation connector 250 to face the rear surface of the second area 220.

When the third area 230 is rotated, the first area 210 may be bent by the connection portions 210b of the first area 210. Since the connection portions 210b are connection grooves formed at positions other than the center of the first area 210, for bending the first area 210, when the third area 230 is rotated, the first area 210 also rotates bent by the connection portions 210b. The connection portions 210b bend the first area 210 to below the center of the first area 210.

That is, as illustrated in FIG. 11, the first area 210 is shaped into a triangle by the connection portions 210b. The third area 230 faces the second area 220 and the first area 210 may be formed into a cradle, thus cradling the electronic device mounted on the first area 210.

That is, the first area 210 may be formed into a stand cradle and the electronic device mounted on the first area 210 may be used in the stand mode. At the same time, as the second area 220 is provided with a keyboard, it may be used as a typing cradle.

Accordingly, the first area 210 with the electronic device mounted on it may be used as a stand cradle and the second area 220 with the keyboard may be used as a typing cradle.

Thus, a user may type on the keyboard and view a video on the electronic device. When the user views the electronic device 10, an appropriate angle of vision should be secured. To secure the appropriate angle of vision, the cradling angle of the stand cradle should be changed. When the third area 230 is moved toward the rear surface of the second area 220, the cradling angle of the first area 210 may be adjusted along with the movement of the third area 230. That is, the user adjusts the angle of vision appropriately by pushing or pulling the third area 230. The user may get an intended angle of vision by adjusting a cradling angle in the stand mode of the electronic device.

The accessory device 200 may be used as a cradle or a cradling angle of the cradle may be adjusted, by moving the third area 230 and thus bending the first area 210 according to the embodiment of the present disclosure. Therefore, a cradling angle may be changed within a convenient field of vision, thereby increasing the utilization of the accessory device 200.

Figure 15:
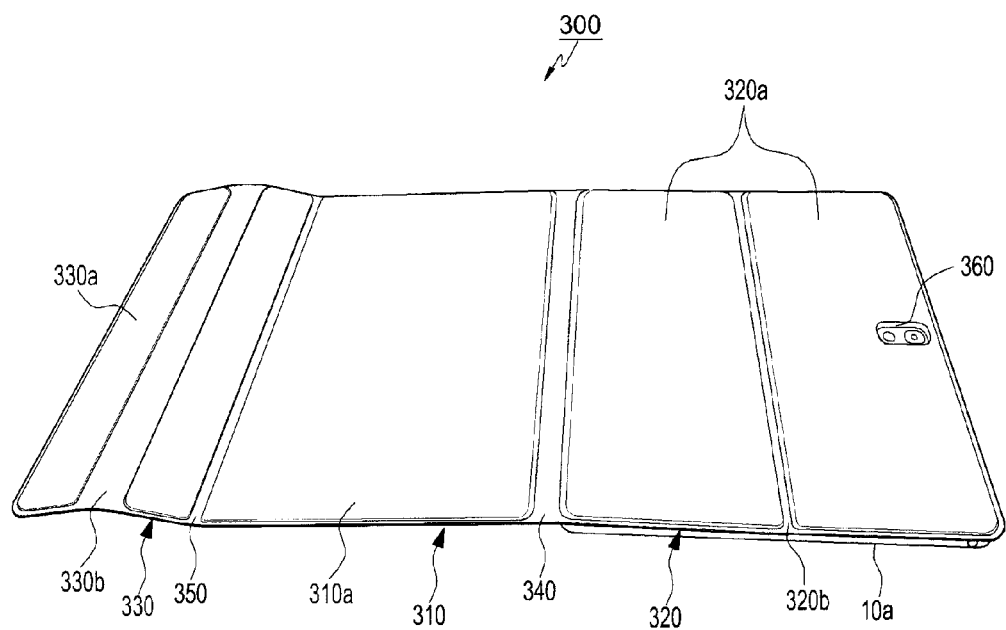
FIG. 15 is a perspective view illustrating the rear surface of another embodiment of an accessory device according to various embodiments of the present disclosure.
Figure 16:
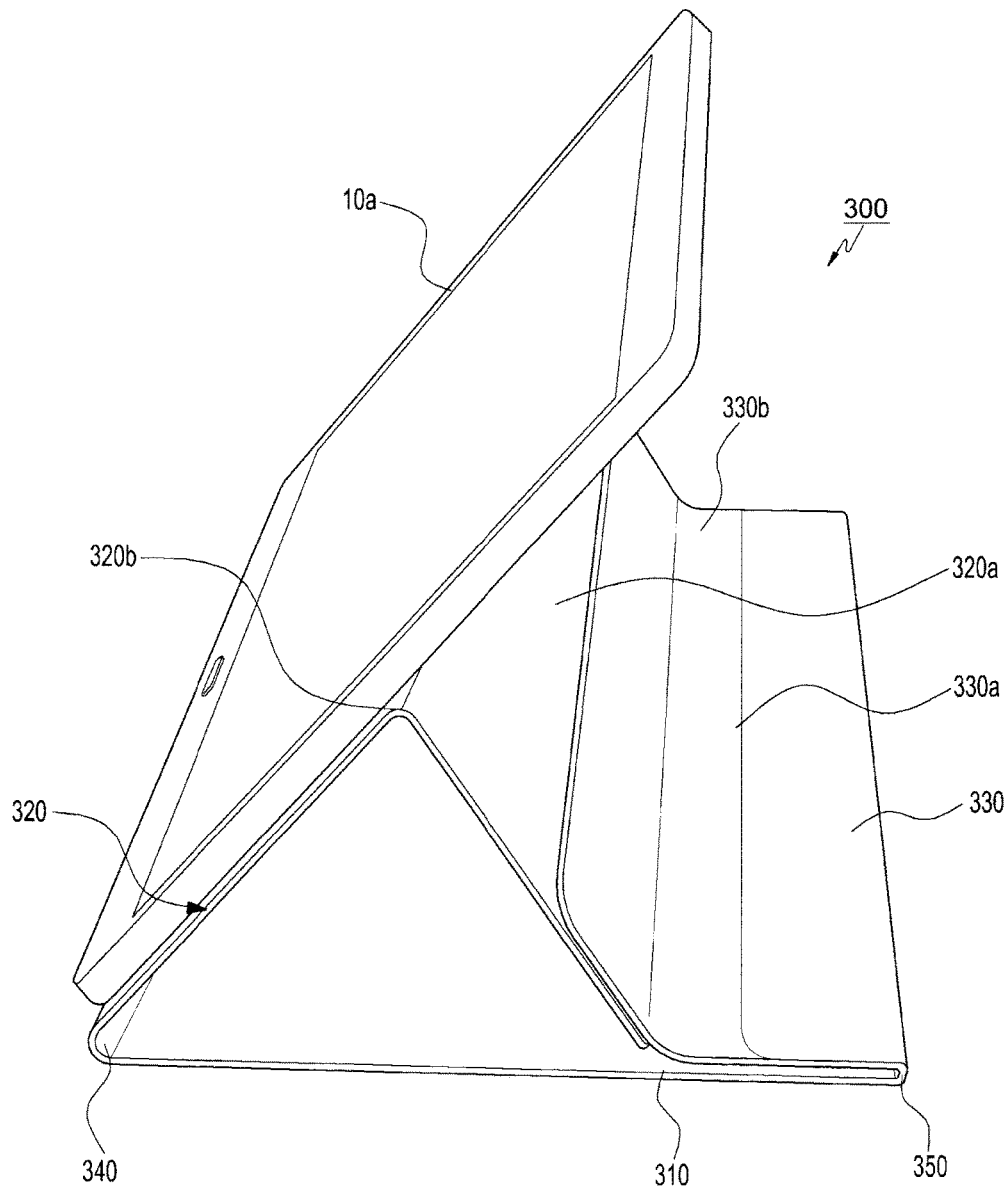
FIG. 16 is a perspective view illustrating a use state of another embodiment of an accessory device according to various embodiments of the present disclosure.

With reference to FIGS. 15 and 16, a description will be given of an accessory device 300 according to another various embodiments of the present disclosure.

FIG. 15 is a perspective view illustrating the rear surface of another embodiment of an accessory device according to various embodiments of the present disclosure. FIG. 16 is a perspective view illustrating a use state of another embodiment of an accessory device according to various embodiments of the present disclosure.

Referring to FIGS. 15 and 16, the structure of the accessory device 300 will be described below. The accessory device 300 may include first, second, and third areas 310, 320, and 330. The first area 210 may be interposed between the second and third areas 320 and 330 to support the second and third areas 320 and 330, when the second and third areas 320 and 330 are used as a cradle.

The rear surface of the electronic device (element 10 shown in FIG. 1) is mounted on the front surface of the second area 320, while the second area 320 is bent to allow use of the first, second, and third areas 310, 320, and 330 as a cradle. The second area 320 may be connected to the first area 310, facing the third area 303, so that the accessory device 300 may be used as a cradle. The third area 330 may be connected to the first area 310 and when the second area 310 is bent, the third area 330 is bent to face the front surface of the second area 320.

In this manner, the second area 320 may be bent and the third area 330 faces the bent second area 320, for use as a cradle. That is, the second and third areas 320 and 330 each are bent and then face each other so that the first, second, and third areas 310, 320, and 330 may be used as a cradle.

As described before with reference to FIG. 13, the first, second, and third areas 310, 320, and 330 include one or more reinforcement portions 310a, 320a, and 330a and connection portions 320b and 330b. The reinforcement portions 310a, 320a, and 330a are configured to support the first, second, and third areas 310, 320, and 330 bendably. The connection portion 320b may be interposed between the reinforcement portions 320a of the second area 320 to interconnect the reinforcement portions 320a bendably. The connection portion 330b may be interposed between the reinforcement portions 330a of the third area 330 to interconnect the reinforcement portions 330a bendably.

The connection portion 320b of the second area 320 may be formed into a connection groove to bend the second area 320 in order to bend the second area 320 at a position other than the center of the second area 320. The connection portion 330b of the third area 330 may be formed into a connection groove to bend the third area 330 in order to bend the third area 330 at a position other than the center of the third area 330.

As illustrated in FIG. 15, first and second rotation connectors 340 and 450 are provided between the first, second, and third areas 310 and 320 and 330 in order to enable rotation of the first, second, and third areas 310, 320, and 330. That is, the first rotation connector 340 is provided between the first and second areas 310 and 320 and thus enables rotation of the first area 310, and the second rotation connector 350 is provided between the first and third areas 310 and 330 and thus enables rotation of the third area 330.

One or more engagement portions (element 190 shown in FIG. 4) or detachable members (not shown) are provided in the first, second, and third areas 310, 320, and 330 in order to attach or remove the electronic devices (elements 10 and 10a shown in FIG. 1). The engagement portions (element 190 shown in FIG. 4) may be formed into engagement connectors to be engaged with or removed from the plurality of connectors (element 191 shown in FIG. 2) of the electronic devices, while electrically connecting to the electronic devices.

The engagement portions (element 190 shown in FIG. 4) and the detachable members have been described before in the foregoing various embodiments of the present disclosure and thus will not described further herein. Likewise, the magnetic force generator and the engagement members are identical to the magnetic force generator (element 140 shown in FIG. 4) and the engagement members (element 121 shown in FIG. 10) in the foregoing various embodiments of the present disclosure and thus will not described further herein.

The first, second, and third areas 310, 320, and 330 may be used as a stand cradle and/or a typing cradle.

The electronic device may include or may be configured as one of a keyboard, a sensor pattern, a conductive pattern, an antenna, a wireless charging circuit, a display, a battery cover, a protection cover, and a flip cover.

Referring to FIGS. 15 and 16, in regard to assembly of the accessory device 300, the accessory device 300 includes the first, second, and third areas 310, 320, and 330, the first rotation connector 340 is interposed between the first and second areas 310 and 320, and the second rotation connector 350 is interposed between the first and third areas 310 and 330. The electronic device is mounted on the front surface of the second area 320. Herein, the connectors (element 191 shown in FIG. 2) of the electronic device are engaged with the engagement portions (element 190 shown in FIG. 4) of the second area 320, in electrical connection.

An operation of the accessory device 300 in this state will be described in greater detail.

The first and second areas 310 and 320 may be rotated by means of the first rotation connector 340. As illustrated in FIG. 15, the front surface of the second area 320 may be inclined for cradling and a part of the second area 320 is bent by the connection portion 320b to face the third area 330.

In this state, the third area 330 may be rotated by the second rotation connector 350 and bent by the connection portion 330b to face the front surface of the second area 320.

In this state, the first area 310 may face the ground surface and the second area 320 with the electronic device 10a mounted on it is inclined and faces the third area 330, maintaining a cradling state.

The second area 310 may be bent by the connection portion 320b of the second area 320. Since the connection portion 320b may be a connection groove that bends the second area 320 at a position other than the center of the second area 320, a part of the second area 320 is bent apart from the rear surface of the electronic device 10a by the connection groove 320b.

That is, as illustrated in FIG. 15, the second area 320 may be shaped into an inclined triangle by the connection portion 320b. The third area 330 faces the front surface of the bent second area 320. That is, the third area 330 may be bent by the connection portion 330b so that one end of the third area 330 faces the second area 320. Herein, the second area 320 may be formed into a cradle, cradling the electronic device mounted on the second area 320.

That is, the second area 320 serves as a stand cradle and the electronic device mounted on the second area 320 may be used in stand mode.

As illustrated in FIG. 15, an exposure hole 360 may be formed in the first or second area 310 and 320 in order to expose one of a camera module or a microphone provided in the electronic device.

In the embodiment of the present disclosure, as the second and third areas 320 and 330 may be bent to serve as a cradle, an electronic device can be readily cradled and thus the utilization of the accessory device 300 can be further increased.

As is apparent from the foregoing description, according to various embodiments of the present disclosure, an accessory device is configured to mount an electronic device on it, to have a plurality of areas for use as a cradle, to be readily used as a cradle for a product, and to further increase the utilization of a product.

Since first and second electronic devices are detachably mounted on the accessory device and first, second, and third areas are defined for use as a cradle according to their curves in the accessory device, the areas in which the electronic devices are mounted are easily used as a stand cradle and a typing cradle.

Further, a plurality of areas are defined to mount an electronic device in them and to be used as a cradle without a magnetic force of a magnet. Thus, when the areas in which electronic devices are mounted are used as a stand cradle and a typing cradle, the use of the areas as the cradles can be further increased.

A plurality of areas are defined to allow adjustment of a cradling angle of a cradle by a magnetic force according to the bending of the first area. Therefore, the cradling angle is readily changed to bring an electronic device mounted in the areas into the field of vision of a user, thereby increasing the use of a product.

Since a plurality of areas are defined to allow adjustment of a cradling angle without a magnetic force of a magnet, the cradling angle can be readily changed within the field of vision and the use of the areas as a cradle can be increased.

While the disclosure has been shown and described with reference to certain embodiments thereof, it will be understood by those skilled in the art that various changes in form and details may be made therein without departing from the spirit and scope of the disclosure as defined by the appended claims and their equivalents.

What is claimed is:

1. An accessory device comprising:
   a first area having a first front surface configured to mount to a rear surface of a first electronic device, the first area being bendable, wherein the first area includes at least two reinforcement portions;
   a second area rotatably coupled to a first edge of the first area, the second area having a second front surface configured to mount to a rear surface of a second electronic device;
   a third area rotatably coupled to a second edge of the first area; and
   a first magnet member and a second magnet member facing the first magnet member;
   wherein when the first area is bent:
   the second area rotates about the first edge,
   a portion of the first front surface smaller than an entire first front surface supports the first electronic device, and
   the third area rotates about the second edge so that a portion of the third area is in overlapping contact with a portion of the second area, forming a cradle for the first electronic device, wherein the first area includes at least one connection portion for bending the first area, wherein an angle of the cradle is adjusted by movement of a magnetic force generated from the first and second magnet members, wherein the first magnet member is included inside the second area, wherein the second magnet member is included inside the third area facing the first magnet member, and configured to adjust a cradling angle of the cradle by facing the first magnet member and sliding under the first magnet member, wherein a magnetic force generator of the accessory device includes the first magnet member and the second magnet member facing the first magnet member, and wherein the cradling angle is adjusted by sliding movement of a magnetic force generated from the first and second magnet members.

2. The accessory device of claim 1, further comprising at least one connection portion for bendably interconnecting the at least two reinforcement portions of the first area.

3. The accessory device of claim 1, further comprising a rotation connector among the first, second, and third areas, for rotating the first, second, and third areas.

4. The accessory device of claim 1, wherein a part of the first area is detachably attached to the rear surface of the electronic device to which the first area is configured to be mounted.

5. The accessory device of claim 1, wherein at least one of the first area and the second area includes at least one of an engagement portion and a detachable member that are configured to attach or detach to an electronic device.

6. The accessory device of claim 5, wherein the detachable member includes a detachable hook attached to or detached from an outer periphery of the electronic device.

7. The accessory device of claim 1, wherein the first area is mounted to the first electronic device and the second area is mounted to the second electronic device.

8. The accessory device of claim 7, wherein the second electronic device is configured to be one of a keyboard, a sensor pattern, a conductive pattern, an antenna, a wireless charging circuit, a display, a battery cover, and a protection cover.

9. The accessory device of claim 1, further comprising an engagement member for keeping the accessory device in a standing cradled state.

10. The accessory device of claim 9, wherein the engagement member includes the magnetic force generator for adjusting the cradling angle of the cradle.

11. The accessory device of claim 9, wherein the engagement member adjusts the cradling angle of the cradle according to engagement with or removal from a protrusion formed in the third area.

12. The accessory device of claim 1, wherein an exposure hole is formed in the first area or the second area, the exposure hole being configured to expose one of a camera module and a microphone provided in the electronic device.

13. The accessory device of claim 1, wherein the third area faces different parts of the second area according to a closed state or a cradled state.

14. The accessory device of claim 1, wherein the second and third areas include an engagement member being configured to generate a force that maintains engagement between the second and third areas, when the second and third areas face each other.

15. The accessory device of claim 14, wherein the engagement member includes a magnetic force generator, and a third magnet member in the second area, for opening and closing the first, second, and third areas by a magnetic force generated by contacting with the second magnet member.

16. The accessory device of claim 1, wherein the second magnet member is a permanent magnet with repeated N and S poles, and wherein the at least one first magnet member is a metal plate.

17. The accessory device of claim 1, wherein the at least one first magnet member is a permanent magnet with repeated N and S poles, and wherein the second magnet member is a metal plate.

18. The accessory device of claim 1, wherein the cradling angle is stationary with respect to the second area, when the cradling angle is adjusted.

19. An accessory device comprising:

a first area, wherein the first area includes at least two reinforcement portions;

a second area rotatably coupled to a first edge of the first area, the second area having a front surface configured to mount to a rear surface of an electronic device and being bendable; and a third area rotatably coupled to a second edge of the first area, and a first magnet member and a second magnet member facing the first magnet member wherein when the second area is bent:

the second area rotates about the first edge, a portion of the front surface smaller than an entire front surface supports the electronic device, and the third area rotates about the second edge so that a portion of the third area is in overlapping contact with a portion of the second area, forming a cradle for the electronic device, wherein the first area includes at least one connection portion for bending the first area, wherein an angle of the cradle is adjusted by movement of a magnetic force generated from the first and second magnet members, wherein the first magnet member is included inside the second area, wherein the second magnet member is included inside the third area facing the first magnet member, configured to adjusting a cradling angle of the cradle by facing the first magnet member and sliding under the first magnet member, wherein an magnetic force generator of the accessory device includes the first magnet member and the second magnet member facing the first magnet member, and wherein the cradling angle is adjusted by sliding movement of a magnetic force generated from the first and second magnet members.

20. The accessory device of claim 19, wherein the connection portion is a connection groove for bending the first area.

21. The accessory device of claim 19, further comprising first and second rotation connectors among the first, second, and third areas, for rotating the first, second, and third areas.

22. The accessory device of claim 19, wherein the second area is disposed at one end of the first area and the third area is disposed at another end of the first area.

23. The accessory device of claim 19, wherein the first, second, and third areas include at least one of a keyboard, a sensor pattern, a conductive pattern, an antenna, a wireless charging circuit, a display, a battery cover, a protection cover, and a flip cover.

24. The accessory device of claim 19, wherein the first, second, and third areas are used as both a stand cradle and a typing cradle, or either of the stand cradle and the typing cradle.

25. The accessory device of claim 19, wherein the first area is detachably engaged with the rear surface of the electronic device and the second area includes one of a keyboard, a sensor pattern, a conductive pattern, an antenna, a wireless charging circuit, a display, a battery cover, a protection cover, and a flip cover.

26. The accessory device of claim 19, wherein the first area is detachably engaged with the rear surface of the electronic device and the second area is integrated with another electronic device.

27. The accessory device of claim 19, further comprising a plurality of engagement members in the second area, for adjusting a cradling angle of the cradle according to engagement with or removal from a protrusion of the third area.

28. The accessory device of claim 19, wherein the first area includes at least one of an engagement portion configured to attach the electronic device and a detachable member configured to attach or detach the electronic device.

29. The accessory device of claim 28, wherein the at least one engagement portion is detachably engaged with a plurality of connectors of the electronic device and is electrically connected to the electronic device.

30. The accessory device of claim 28, wherein the detachable member includes a detachable hook that is one of attached to and detached from an outer periphery of the electronic device.

31. The accessory device of claim 19, wherein the second and third areas include an engagement member for generating a force that maintains engagement between the second and third areas, when the second and third areas face each other.

32. The accessory device of claim 31, wherein the engagement member includes a magnetic force generator, and
a third magnet member in the second area, for opening and closing the first, second, and third areas by a magnetic force generated by contacting with the second magnet member.

33. The accessory device of claim 19, wherein the second magnet member is a permanent magnet with repeated N and S poles, and wherein the at least one first magnet member is a metal plate.

34. The accessory device of claim 19, wherein the at least one first magnet member is a permanent magnet with repeated N and S poles, and wherein the second magnet member is a metal plate.

* * * * *